(12) United States Patent
Makke et al.

(10) Patent No.: US 11,543,247 B2
(45) Date of Patent: Jan. 3, 2023

(54) METHODS AND SYSTEMS FOR VEHICLE LOCALIZATION

(71) Applicant: Ford Global Technologies, LLC, Dearborn, MI (US)

(72) Inventors: Omar Makke, Lyon Township, MI (US); Oleg Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 293 days.

(21) Appl. No.: 16/919,301

(22) Filed: Jul. 2, 2020

(65) Prior Publication Data
US 2022/0003552 A1    Jan. 6, 2022

(51) Int. Cl.
*G01C 21/14* (2006.01)
*G01C 21/16* (2006.01)
*G05D 1/02* (2020.01)

(52) U.S. Cl.
CPC ........... *G01C 21/166* (2020.08); *G01C 21/14* (2013.01); *G05D 1/0227* (2013.01)

(58) Field of Classification Search
CPC ..... G01C 21/166; G01C 21/14; G05D 1/0227
See application file for complete search history.

(56) References Cited

U.S. PATENT DOCUMENTS

| 8,958,979 | B1  | 2/2015  | Levine et al. |
| 9,482,538 | B1* | 11/2016 | Pathangay ............... G08G 1/02 |
| 2018/0188043 | A1 | 7/2018 | Chen et al. |
| 2019/0271549 | A1 | 9/2019 | Zhang et al. |
| 2019/0316914 | A1* | 10/2019 | Shin ....................... G01C 21/30 |

OTHER PUBLICATIONS

Qiuxia Chen, et al., "A Speed Hump Sensing Approach To Global Positioning In Urban Cities Without GPS Signals", published May 29-31, 2017.

* cited by examiner

*Primary Examiner* — Vivek D Koppikar
*Assistant Examiner* — Jeffrey R Chalhoub
(74) *Attorney, Agent, or Firm* — Brandon Hicks; Eversheds Sutherland (US) LLP

(57) ABSTRACT

Methods and systems for vehicle localization are provided herein. An example method can include obtaining a map within an operating area. A location within the operating area is associated with a pattern of speed bumps that is configured to produce a vehicle pitch response from the vehicle when the vehicle travels over the pattern of speed bumps. The method can include obtaining motion sensor information from a vehicle sensor, determining when the motion sensor information matches the vehicle pitch response, and determining that the vehicle is in the location when the motion sensor information corresponds to the vehicle pitch response of the location.

18 Claims, 4 Drawing Sheets

METHODS AND SYSTEMS FOR VEHICLE LOCALIZATION

BACKGROUND

Communication enabled devices providing localization determination functionalities can be deleteriously affected in areas where connectivity is reduced or is non-existent. For example, a mobile device or vehicle that is configured to determine its location from received Global Positioning Signal (GPS) information may be unable to determine its location when connectivity is compromised or is non-existent.

Dead reckoning can be used whenever a device, such as a vehicle, estimates its position by relying on vehicle dynamics and not GPS signal. The loss of GPS signal is very common in parking structures, which makes it difficult for vehicles to park autonomously (for autonomous valet parking applications in particular). Vehicles which can autonomously park are not limited to autonomous vehicles. For example, driver-operated vehicles equipped with Advanced Driver Assist System (ADAS) can also autonomously park.

In an example use case, a communications device within the parking structure may transmit location signals to the vehicle. Once within the parking structure and the GPS signal is lost, the vehicle has to estimate its position accurately to be able to perform turns when needed or to start the automatic parking system, which may require knowledge about the infrastructure.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
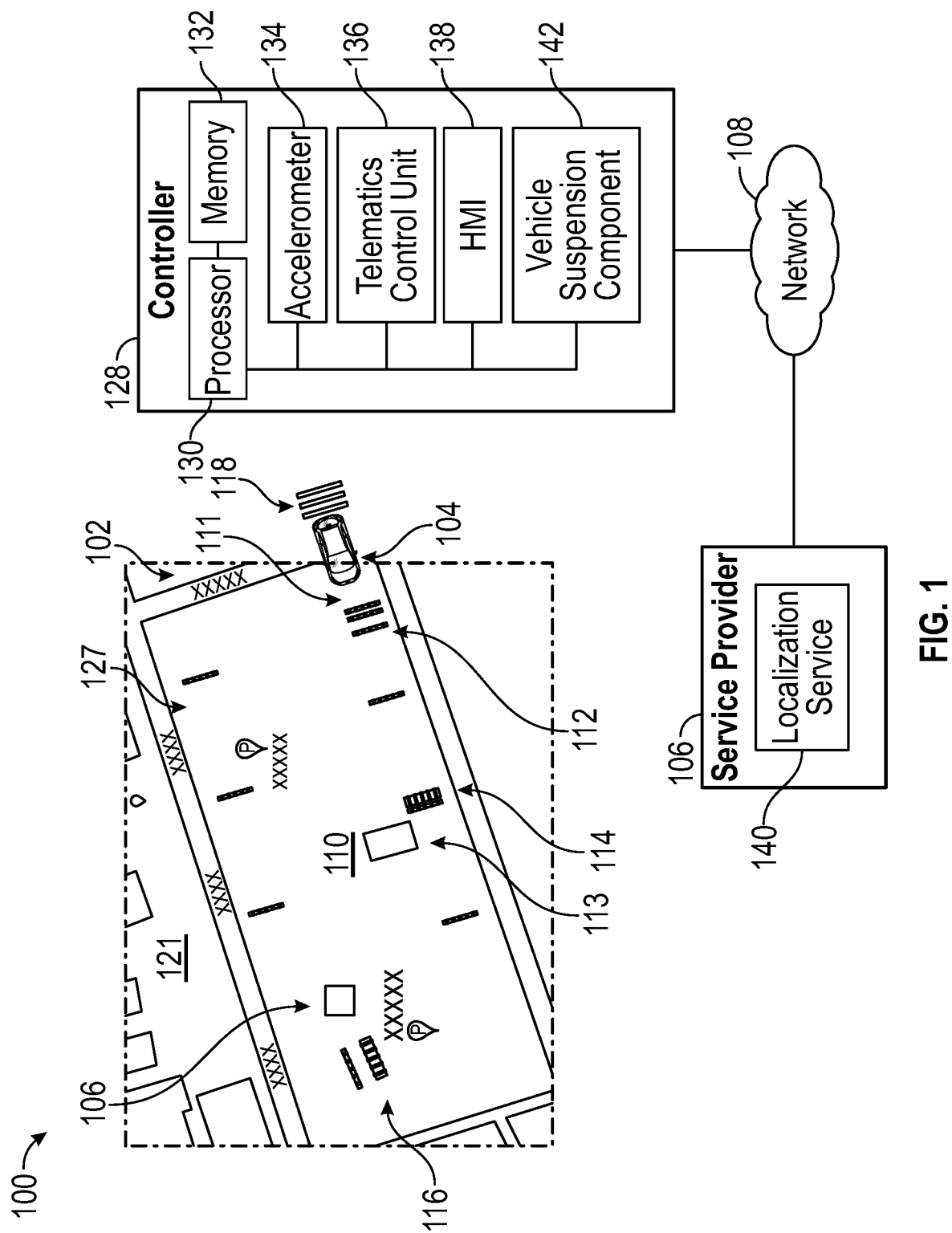
FIG. 1 depicts an illustrative architecture in which techniques and structures for providing the systems and methods disclosed herein may be implemented.

The present disclosure pertains to methods and systems that allow a vehicle to determine its location in areas where communication capabilities are reduced or unavailable. In general, the present disclosure can involve the use of speed bumps provisioned in an operating area. The speed bumps can be arranged in discreet or unique patterns which allow the speed bumps to be used to identify specific locations within the operating area. A unique pattern can be created by selecting spacing between adjacent speed bumps, varying geometric size differences between adjacent speed bumps, or combinations thereof.

By way of example, a location within in a parking garage may be identified by a pattern of speed bumps, such as three speed bumps. In one example, a first speed bump can be spaced two feet from the second speed bump, and the second speed bump can be spaced apart from the third speed bump at a distance of four feet. An entry to a particular level of the parking garage could be identified by a first speed bump that has a width of two feet followed by a second speed bump having a width of three feet, with the first and second speed bumps being spaced apart by a distance of two feet. In yet another example, a height of a speed bump could also be used as a distinctive aspect. For example, a first speed bump may have a height of three inches, whereas a second speed bump may have a height of seven inches. This differential in speed bump height between two or more speed bumps may result in a unique vehicle pitch response that is distinct from a pattern of speed bumps that would be different from two otherwise similar speed bumps having identical or similar heights relative to one another.

Broadly, when the vehicle traverses within the operating area, it may encounter some of these unique patterns of speed bumps. As the vehicle drives over a unique pattern of speed bumps, a corresponding vehicle pitch response occurs. Generally, the vehicle may experience a change in pitch (e.g., upward deflection or movement) as it traverses over the unique pattern of speed bumps. These pitch responses can be identified by monitoring motion sensing elements, such as an accelerometer or the like, onboard the vehicle. The pitch response can be determined by measuring deflection of a vehicle suspension component, such as the travel of a shock absorber or deflection of a leaf spring, to name a few. This pitch response can be measured and converted into a measured vehicle pitch response.

The vehicle can include a controller that may determine the vehicle location using a map. The map identifies specific locations within the operating area, and each of these locations is associated with a unique pattern of speed bumps. The each unique pattern of speed bumps may be associated with expected vehicle pitch responses. That is, the map links an expected vehicle pitch response to a location. The vehicle can determine its location by comparing motion sensor signals to these expected vehicle pitch responses. When the motion sensor signals correspond to one of the expected vehicle pitch responses, the vehicle can confirm its localization in the operating area. The vehicle can further estimate its location using the localization feature in combination with a vehicle velocity.

It will be understood that the vehicle could alternatively determine its location through communicating with an infrastructure device (e.g., service provider) that is configured to perform the vehicle localization signal comparison process above. The systems and methods herein can be configured to allow a vehicle to infer its direction of travel based on speed bump interaction and/or to navigate the operating area based on prior knowledge when speed bump interaction cannot be determined.

Illustrative Embodiments

Turning now to the drawings, FIG. 1 depicts an illustrative architecture 100 in which techniques and structures of the present disclosure may be implemented. The architecture 100 can comprise an operating area 102, a vehicle 104, and a service provider 106. The vehicle 104 can communicate with the service provider 106 through a network 108. The network 108 may include any one or a combination of multiple different types of networks, such as cable networks, the Internet, wireless networks, and other private and/or public networks. In some instances, the network 108 may include cellular, Wi-Fi, or Wi-Fi direct. As noted above, the vehicle 104 can be adapted to perform vehicle localization directly, while in some instances the vehicle localization can be a cooperative effort between the vehicle 104 and the service provider 106, as will be discussed in greater detail.

The operating area 102 could include a parking garage, but it will be understood that the operating area 102 can include any area in which a vehicle can operate in accordance with the present disclosure. The operating area 102 is illustrated as a map 121 in some use cases, as will be discussed in greater detail. The systems and methods disclosed herein allow a vehicle 104 to determine its location in a location where connectivity is poor or unavailable. While some of these locations would include parking garages as an example, the present disclosure is not so limited and can be used to enable object localization in any location where connectivity is reduced or unavailable. For example, a remote rural location may have a parking facility that is in an area of reduced or non-existent connectivity.

An example configuration of the operating area 102 could include a floor 110 of a parking garage. The floor 110 could include a plurality of locations that can each be associated with a pattern of speed bumps. For example, an entry ramp 111 (an example location) to the floor 110 could be associated with a first unique pattern of speed bumps 112. Another area of the floor 110 could be associated with a second unique pattern of speed bumps 114. A reserved parking spot 113 could be identified with the second unique pattern of speed bumps 114. Again, these are merely examples of how an operating area could be configured with unique patterns of speed bumps in accordance with the present disclosure and are not intended to be limiting. The operating area 102 could include a unique set of entry speed bumps 118 that indicate to the vehicle 104 that it has entered the operating area 102.

Figure 2:
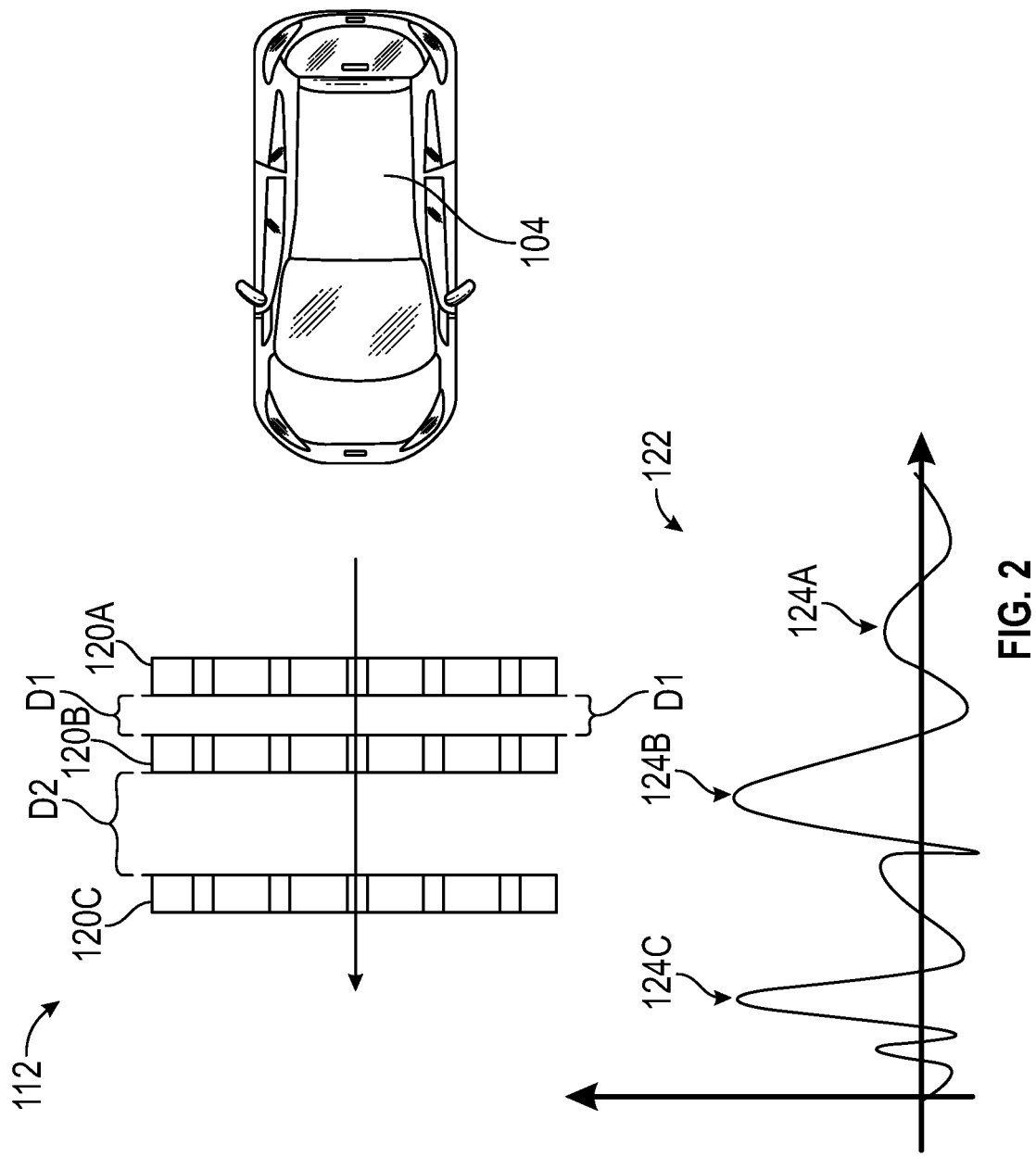
FIG. 2 illustrates an example unique pattern of speed bumps in association with an illustrated an example expected vehicle pitch response graph.

In general, a unique pattern of speed bumps is associated with a particular/discrete location in the operating area 102. The unique pattern of speed bumps is intended to produce a vehicle pitch response (upward movement of the vehicle) when a vehicle 104 drives over the unique pattern of speed bumps. As illustrated in FIG. 2, the first unique pattern of speed bumps 112 includes speed bumps 120A, 120B, and 120C. The first speed bump 120A is spaced apart from the second speed bump 120B at a distance D1 that is less than a distance D2 between the second speed bump 120B and the third speed bump 120C. Through empirical measurement, it is understood that an expected vehicle pitch response may be produced when the vehicle 104 drives over the speed bumps 120A, 120B, and 120C at a particular speed, which can be tied to a speed limit within the parking garage, such as ten miles per hour. The expected vehicle pitch response is represented in graphical form in graph 122. The graph 122 includes pitch change areas 124A, 124B, and 124C, which correspond to observed pitch changes of the vehicle 104 that should be sensed by a motion sensor of the vehicle 104 as it drives over the speed bumps 120A, 120B, and 120C. It will be understood that these speed bump patterns are not intended to be limiting in nature, but are merely provided as example patterns.

The map 121 can be created of the operating area 102, with specific locations within the operating area 102 being linked to an expected vehicle pitch response. A location can be associated with a unique pattern of speed bumps which produce an expected vehicle pitch response. Some areas of the operating area 102 are provided with speed bumps that are arranged not in unique patterns, but in repeatable patterns, such as speed bump grouping 127 (three evenly spaced speed bumps). For example, spaces between locations may be provided with repeating pattern speed bumps. An area of repeating pattern speed bumps could exist between the first unique pattern of speed bumps 112 and the second unique pattern of speed bumps 114, and between the second unique pattern of speed bumps 114 and the third unique pattern of speed bumps 116. While the map 121 has been illustrated for descriptive purposes, the map 121 can also be represented as a data structure such as a table or record. A repeatable pattern could be used to provide general feedback to the vehicle that is it traveling between identifiable locations but that the vehicle 104 is generally traveling in a designated or acceptable part of the operating area 102. For example, the sensing of the repeatable pattern by the vehicle 104 could indicate that the vehicle 104 has not deviated from operating in a safe driving area or lane.

Referring to FIGS. 1 and 2 collectively, in addition to associating a location with an expected vehicle pitch response, the location can be associated with location information, such as a GPS coordinates. Alternatively, the location may be identified by a name or as a general section of the operating area 102.

A map of locations of the operating area can be created that link the vehicle pitch responses with their respective locations and unique patterns of speed bumps. The location can be identified generally or specifically using GPS coordinates. A map of the present disclosure can be used at the vehicle level or at the service provider level.

The vehicle 104 can comprise a controller 128 that in turn comprises a processor 130 and memory 132. The memory 132 stores instructions that are executed by the processor 130 to perform aspects of vehicle localization and navigation as disclosed throughout. When referring to operations executed by the controller 128 it will be understood that this includes the execution of instructions by the processor 130.

The controller 128 can be configured to obtain pitch data from one or more motion sensors. For example, the vehicle 104 can comprise an accelerometer 134 associated with the vehicle body. The accelerometer 134 generates motion sensor information as the vehicle 104 operates within the operating area 102. As the vehicle 104 traverses, the motion sensor information generated by the accelerometer 134 can be processed by the controller 128 to determine vehicle pitch response data. The controller 128 can be configured to utilize machine learning and/or artificial intelligence techniques to process the motion sensor information. For example, the controller 128 can utilize a recursive neural network to process the motion sensor information and detect signal patterns in time series. The controller 128 processes the motion sensor information to create a measured vehicle pitch response. This measured vehicle pitch response can be represented as a graph in a similar format to the graph 122 of FIG. 2. Also, while pitch data can be determine from motion sensor information, measured vehicle pitch responses (e.g., pitch data) can be determined from displacement of a vehicle suspension component 142. For example, the travel of a shock absorber of the vehicle 104 can be measured, quantified, and converted into a measured vehicle pitch response.

Once the motion sensor information has been processed to create the measured vehicle pitch response, the controller 128 can compare the measured vehicle pitch response with expected vehicle pitch responses included in the map 121 provided to the vehicle 104. If a match (either fuzzy or exact) can be determined by the controller 128, the vehicle 104 can establish its location from this matching process. As noted above, the location for the vehicle can be understood as a general position within the operating area 102 or a more specific, granular location identified by specific geophysical coordinates which are associated with the location and built into the map 121.

If the vehicle 104 is moving during this localization process, information from a telematics control unit 136 of the vehicle 104 can be used to determine a current vehicle velocity and determine an estimated position of the vehicle 104 based on the last known position of the vehicle 104 as it passed over a location on the map 121. This type of estimated position could be displayed on a human machine interface (HMI 138) of the vehicle 104. For example, a navigation feature could display a representation of the map 121 with the estimated vehicle position displayed thereupon. The estimated position could be determined by the controller 128 using a dead reckoning technique that is informed and enhanced by the localization processes disclosed herein.

In addition to localization, the patter of speed bumps can be interpreted by the controller 128 to infer a direction of travel for the vehicle 104. When the speed bumps are arranged in a non-linear pattern, such as the first unique pattern of speed bumps 112 where the irregular spacing exists between adjacent pairs of speed bumps, this can allow for inference of a direction of travel. For example, when the vehicle 104 is traveling from left-to-right across the first unique pattern of speed bumps 112, the measured vehicle pitch response generated by the controller 128 is distinct from the measured vehicle pitch response generated by the controller 128 when the vehicle 104 is traveling from right-to-left across the first unique pattern of speed bumps 112.

While some of the above-described embodiments contemplate vehicle localization and navigation being performed at the vehicle level, the vehicle localization and navigation can be performed cooperatively between the controller 128 and the service provider 106. For example, the service provider 106 can be configured with localization service 140 that receives the motion sensor information from the vehicle 104 over the network 108. The service provider 106 can use the localization service 140 to compare the motion sensor information (e.g., measured vehicle pitch response) to the expected vehicle pitch responses of the locations of the operating area 102 and determine if a match exists. If a match exists, the localization service 140 can identify the location and transmit location information associated with the location back to the vehicle 104 for navigation guidance and/or display of localization. As noted above, the location information and vehicle velocity information obtained from the telematics control unit 136 can be used in combination to provide vehicle position estimation as the vehicle is traveling. Assuming clock synchronization exists between the service provider 106 and the controller 128 of the vehicle 104, the service provider 106 can also use the information obtained from the telematics control unit 136 in combination with the localization information to assess a moving vehicle's estimated position. The service provider 106 could be installed as an infrastructure device near or within the operating area.

The vehicle localization and navigation can also be performed cooperatively between the controller 128, the service provider 106, and/or the speed bumps. For example, the speeds bumps may be "smart" speed bumps, which are connected to the network. In other instances, the speed bumps may communicate directly with the vehicles.

In certain embodiments, the speeds bumps may include one or more energy harvesting devices that harvest the energy of vehicles passing over the speed bumps. For example, the speed bumps may cause a chance in the potential energy of the vehicle about the speed bumps as the vehicle is raised and lowered over the speed bumps. This potential energy may be captured by the speed bumps. For example, the energy from the motion and weight of the vehicles passing over the speed bumps can be harvested through various mechanisms, including using piezoelectric materials, spring with magnets and coils, or any other known mechanisms. The speed bumps may include an energy storage device, such as a capacitor or battery, which allows the speed bumps to store excess energy. In this manner, the speed bumps can be powered for long durations.

As noted above, the vehicles may communicate directly with the speed bumps. In this mode, the energy consumption of the smart speed bumps may be reduced because the signal range is reduced. The speed bump may only need to communicate with the vehicle on top of it, and the vehicle knows to look for a local signal, such as Bluetooth Low Energy or the like, because the vehicle's accelerometer may detected a bump. In other instances, the speed bump sensors may communicate with the infrastructure. For example, the vehicle may detect a speed bump and send a single to the service provider indicating that a speed bump was detected. In such instances, the speed bump may also send trigger information to the service provider. The service provider may match each bump to the vehicle for localization purposes.

Figure 3:
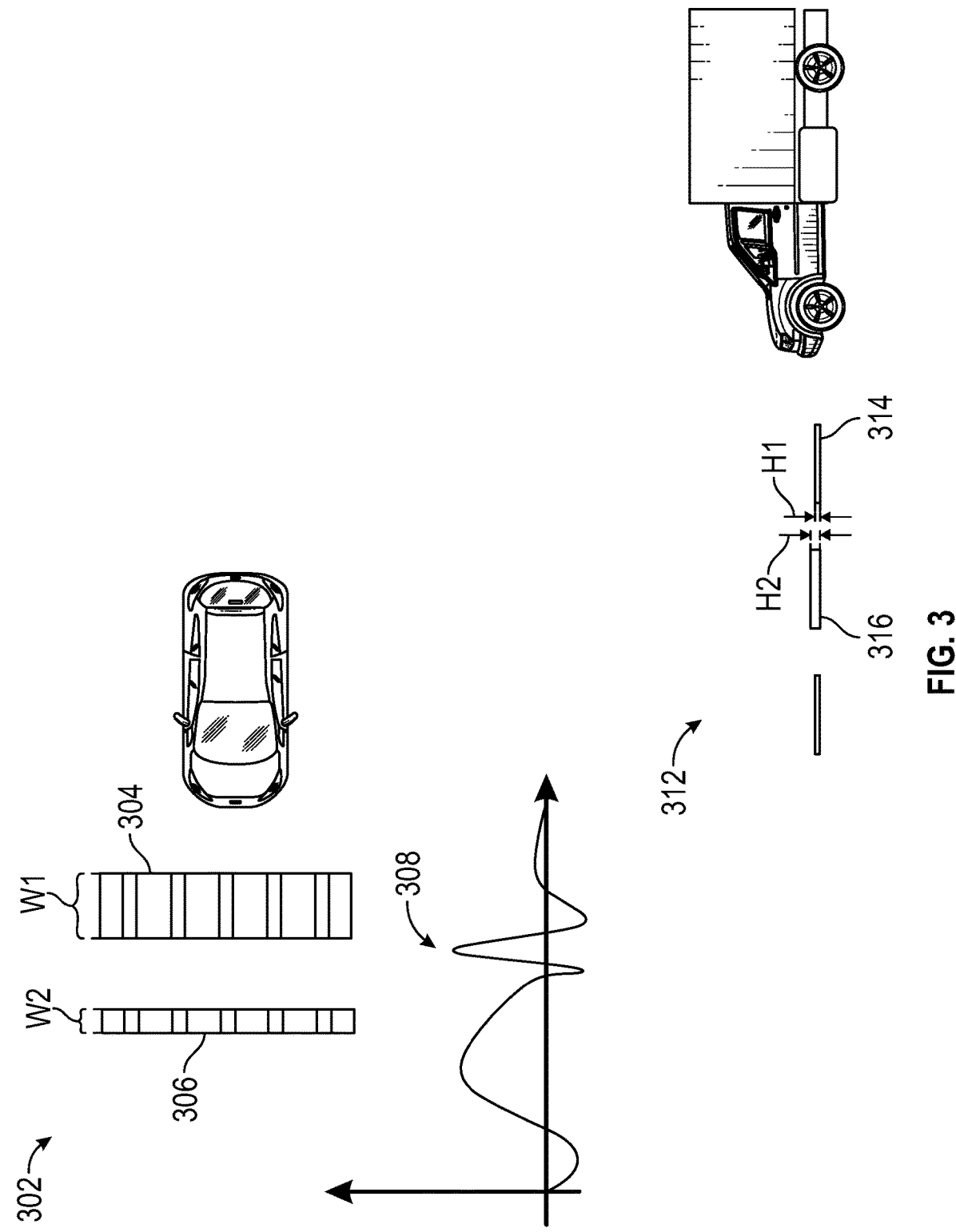
FIG. 3 illustrates various speed bump pattern configurations.

FIG. 3 illustrates some example speed bump patterns or configurations that can be used in accordance with the present disclosure. Speed bump pattern 302 includes two speed bumps with differing width dimensions. For example, speed bump 304 has a width W1 that is greater than a width W2 of an adjacent speed bump 306. An expected vehicle pitch response graph 308 for the speed bump pattern 304 is also illustrated. Pitch amplitude is determined from accelerometer signals as the vehicle passes over the speed bumps, from right to left. It will be assumed that all bumps are initiated such that front wheel contact occurs before rear wheel contact.

Another example speed bump pattern 312 is illustrated in a plan or side view. Speed bump pattern 312 includes two speed bumps with differing height dimensions. For example, speed bump 314 has a height dimension H1 that is less than a height dimension H2 of an adjacent speed bump 316. A speed bump can have unique height and width dimensions which will produce a specific signature or vehicle pitch response which can be detected using, for example, a recursive neural network. The recursive neural network can be trained to recognize specific speed bump patterns and their expected vehicle pitch responses, as well as providing matching between measured vehicle pitch responses (e.g., motion sensor information) and expected vehicle pitch responses.

Referring back to FIG. 1, in some instances if the controller 128 determines that the vehicle has not encountered any speed bumps after entering an operating area of the present disclosure, the controller 128 can default to relying on prior navigation information to navigate the vehicle through the operating area. This prior navigation information can be used when speed bumps have not been encountered by the vehicle after driving within the operating area for a period of time or after a predetermined distance. The predetermined distance could be measured from a pattern of entrance speed bumps near an entry point of the operating area. The prior navigation information can be collected from prior instances where the vehicle (or other vehicles) has driven through the operating area. The controller 128 can also be configured to feed vehicle operating information such as localization and position determinations back into the prior navigation information to improve and update this logic. The controller 128 can utilize the prior navigation information when motion sensor information or measured vehicle pitch responses are unavailable or when they cannot be matched to expected vehicle pitch responses.

Figure 4:
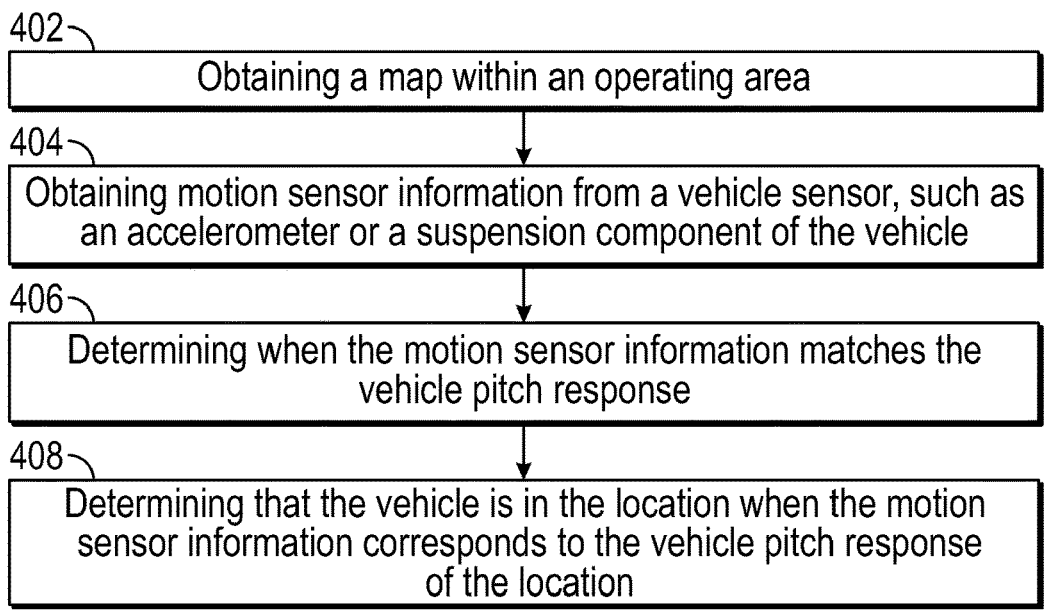
FIG. 4 is a flowchart of an example method of the present disclosure.

FIG. 4 is a flowchart of an example method of the present disclosure. The method includes a step 402 of obtaining a map within an operating area. As noted above, the location can be one of many locations with the operating area. Each of the locations can be associated with a pattern of speed bumps that is configured to produce a vehicle pitch response from the vehicle when the vehicle travels over the pattern of speed bumps.

Next, the method can include a step 404 of obtaining motion sensor information from a vehicle sensor, such as an accelerometer or a suspension component of the vehicle. The method can include a step 406 of determining when the motion sensor information matches the vehicle pitch response. The motion sensor information can be used to determine a measured vehicle pitch response and this can be matched with an expected vehicle pitch response (referred to generally above as the vehicle pitch response).

The method can include a step 408 of determining that the vehicle is in the location when the motion sensor information corresponds to the vehicle pitch response of the location. In this method, the step of obtaining the map (step 402) could include a controller of a vehicle obtaining the map, or the loading of the map by a service provider. When a service provider is involved, the method can include a steps related to transmitting the motion sensor information to a service provider, as well as receiving location information from the service provider when the service provider matches the motion sensor information to the vehicle pitch response of the location.

Figure 5:
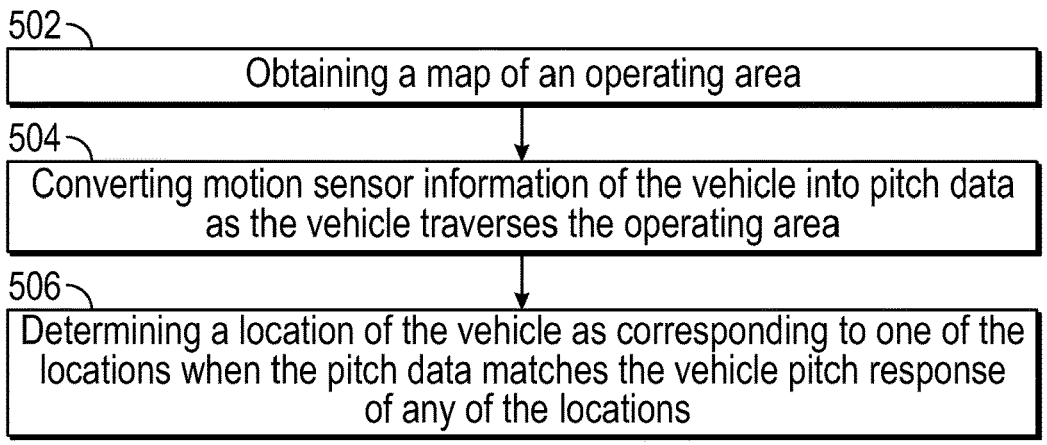
FIG. 5 is a flowchart of another example method of the present disclosure.

FIG. 5 is a flowchart of another example method of the present disclosure. The method can include as step 502 of obtaining a map of an operating area. The map can identify locations within the operating area. As noted above, each of the locations can be uniquely identified using a pattern of speed bumps, where the pattern of speed bumps producing a vehicle pitch response by the vehicle when the vehicle travels over the pattern of speed bumps. The method includes a step 504 of converting motion sensor information of the vehicle into pitch data as the vehicle traverses the operating area, as well as a step 506 of determining a location of the vehicle as corresponding to one of the locations when the pitch data matches the vehicle pitch response of any of the locations.

Figure 6:
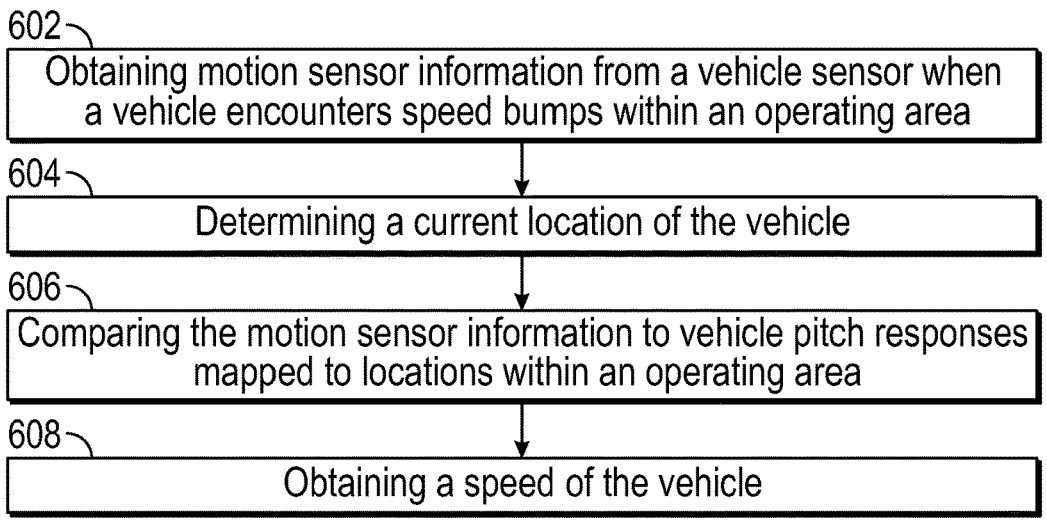
FIG. 6 is a flowchart of yet another example method of the present disclosure.

FIG. 6 is another example method of the present disclosure. The method includes a step 602 of obtaining motion sensor information from a vehicle sensor when a vehicle encounters speed bumps within an operating area. Next, the method can include a step 604 of determining a current location of the vehicle. In some instances, the current location of the vehicle can be determined using motion sensor information and vehicle velocity. Thus, the process of determining the current location of the vehicle can further include a step 606 of comparing the motion sensor information to vehicle pitch responses mapped to locations within an operating area. Each of the locations can be associated with a discreet pattern of speed bumps. The current location can also be determined by a step 608 of obtaining a speed of the vehicle. The current location of the vehicle can be determined using both the motion sensor information and the speed of the vehicle collectively.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
obtaining, by a processor in a vehicle, a map of an operating area, wherein a location within the operating area includes a set of speed bumps arranged in a pattern that is configured to produce an expected vehicle pitch response;
determining, by the processor, a first vehicle pitch response based on evaluating a displacement of a suspension component of the vehicle when the vehicle travels over the set of speed bumps;
comparing, by the processor, the first vehicle pitch response to the expected vehicle pitch response; and
identifying, by the processor, the location within the operating area upon obtaining a match between the first vehicle pitch response and the expected vehicle pitch response, wherein the expected vehicle pitch response is represented in a graphical form, and wherein determining, by the processor, the location of the vehicle comprises matching the first vehicle pitch response to the expected vehicle pitch response that is represented in the graphical form.

2. The method according to claim 1, wherein the first vehicle pitch response comprises a non-symmetric pattern that corresponds to at least one of a difference in geometric size between adjacent speed bumps in the set of speed bumps or a difference in spacing between adjacent speed bumps in the set of speed bumps.

3. The method according to claim 1, wherein the expected vehicle pitch response is based on an empirical measurement.

4. The method according to claim 1, wherein identifying the location comprises:
transmitting the first vehicle pitch response to a service provider; and receiving location information from the service provider based on the service provider matching the first vehicle pitch response to the expected vehicle pitch response of the location.

5. The method according to claim 1, further comprising determining that the vehicle is within the operating area by detecting that the vehicle encountered a pattern of entrance speed bumps near an entry point of the operating area based on motion sensor information.

6. The method according to claim 1, further comprising navigating the vehicle through the operating area based on prior navigation information when the pattern of speed bumps have not been encountered by the vehicle after driving within the operating area for a period of time or after a predetermined distance.

7. A method, comprising:
obtaining, by a processor in a vehicle, a map of an operating area, the map identifying locations within the operating area, each of the locations being uniquely identifiable by a set of speed bumps, the set of speed bumps arranged to produce an expected vehicle pitch response corresponding to at least one of a difference in geometric size between adjacent speed bumps in the set of speed bumps or a difference in spacing between adjacent speed bumps in the set of speed bumps;
determining, by the processor, a first vehicle pitch response as the vehicle traverses the operating area, the first vehicle pitch response based on quantifying motion sensor information obtained from a suspension component of the vehicle; and
determining, by the processor, a location of the vehicle as corresponding to one of the locations based on the first vehicle pitch response matching the expected vehicle pitch response of any of the locations, wherein the expected vehicle pitch response is represented in a graphical form, and wherein determining, by the processor, the location of the vehicle comprises matching the first vehicle pitch response to the expected vehicle pitch response that is represented in the graphical form.

8. The method according to claim 7, further comprising determining that the vehicle is within the operating area.

9. The method according to claim 7, wherein each of the set of speed bumps comprises a non-symmetric pattern, and wherein the method further comprises determining a direction of travel of the vehicle based on the motion sensor information.

10. The method according to claim 7, further comprising determining a speed of the vehicle, wherein the motion sensor information from the vehicle is determined in combination with the speed of the vehicle.

11. The method according to claim 7, further comprising:
transmitting the motion sensor information to a service provider; and
receiving location information from the service provider when the service provider matches the motion sensor information to the expected vehicle pitch response of any of the locations.

12. The method according to claim 7, further comprising navigating the vehicle through the operating area based on prior navigation information when the set of speed bumps have not been encountered by the vehicle after driving within the operating area for a period of time or after a predetermined distance.

13. A system, comprising:
a processor; and
a memory for storing instructions, the processor executing the instructions to:
obtain motion sensor information from a vehicle sensor when a vehicle encounters speed bumps within an operating area, wherein at least a first location within the operating area is identifiable by a first set of speed bumps arranged to produce a first expected vehicle pitch response comprising a first pattern produced due to at least one of a difference in geometric size between adjacent speed bumps in the first set of speed bumps or a difference in spacing between adjacent speed bumps in the first set of speed bumps;
determine a first vehicle pitch response as the vehicle traverses the operating area, the first vehicle pitch response based on measuring and quantifying the motion sensor information obtained from the vehicle sensor; and
determine a current location of the vehicle as being the first location based on obtaining a match between the first vehicle pitch response and the first expected vehicle pitch response, wherein the first expected vehicle pitch response is represented in a graphical form, and wherein determining, by the processor, the current location of the vehicle comprises matching the first vehicle pitch response to the first expected vehicle pitch response that is represented in the graphical form.

14. The system according to claim 13, further comprising a service provider configured to compare the motion sensor information to vehicle pitch responses mapped to locations within the operating area.

15. The system according to claim 14, wherein the processor is configured to transmit the motion sensor information to the service provider and receive the current location from the service provider.

16. The system according to claim 13, wherein the processor is configured to navigate the vehicle through the operating area as the current location is determined over time.

17. The system according to claim 13, wherein the processor is configured to navigate the vehicle through the operating area based on prior navigation information when speed bumps have not been encountered by the vehicle after driving within the operating area for a period of time or after a predetermined distance.

18. The system according to claim 17, wherein the processor is configured to periodically update the prior navigation information with the motion sensor information and the current location of the vehicle as the current location changes over time as the vehicle is within the operating area.

* * * * *